United States Patent
Miknevich et al.

[11] Patent Number: 6,126,837
[45] Date of Patent: Oct. 3, 2000

[54] METHOD FOR REMOVING SUSPENDED PARTICLES USING MANNICH-DERIVED POLYETHERS

[75] Inventors: Joseph P. Miknevich, Coraopolis; Shih-Ruey T. Chen, Pittsburgh, both of Pa.

[73] Assignee: Calgon Corporation, Pittsburgh, Pa.

[21] Appl. No.: 09/249,382

[22] Filed: Feb. 12, 1999

[51] Int. Cl.⁷ ........................................ C02F 1/56
[52] U.S. Cl. .............. 210/705; 209/5; 210/708; 210/725; 210/727; 210/728; 210/734; 210/735; 210/928; 524/922
[58] Field of Search ............... 209/5; 210/725, 210/727, 728, 735, 736, 928, 708, 705, 734; 524/922

[56] References Cited

U.S. PATENT DOCUMENTS

| | | | |
|---|---|---|---|
| 3,436,373 | 4/1969 | Cox et al. .................. | 260/51.5 |
| 3,790,606 | 2/1974 | Sellet ...................... | 260/401 |
| 4,001,155 | 1/1977 | Kempter et al. . | |
| 4,014,955 | 3/1977 | Rettner . | |
| 4,396,732 | 8/1983 | Sekmakas et al. . | |
| 4,792,355 | 12/1988 | Siegl et al. . | |
| 4,795,505 | 1/1989 | Siegl et al. . | |
| 4,883,826 | 11/1989 | Marugg et al. . | |
| 4,917,729 | 4/1990 | Siegl et al. . | |
| 4,952,732 | 8/1990 | Speranza et al. . | |
| 5,247,087 | 9/1993 | Rivers ...................... | 544/357 |

FOREIGN PATENT DOCUMENTS

WO 95/28449 10/1995 WIPO .

OTHER PUBLICATIONS

Japanese Abstract 58153506, Sep. 12, 1983.
German Abstract 2333927, Jan. 23, 1975.
BE Abstract 774357A, Feb. 5, 1974.
Chem Abstract 100;158581, 1984.

*Primary Examiner*—Peter A. Hruskoci
*Attorney, Agent, or Firm*—Diane R. Myers; Eckert Seamans Cherin & Mellott, LLC

[57] ABSTRACT

Methods for removing suspended particles from a solution are disclosed. These methods generally comprise adding to the solution to be treated an effective amount of a composition comprising a Mannich derivatized polyether. The polyether is generally described as the condensation polymer of Mannich derivatized bisphenol and a difunctional monomer. The methods have broad application in a wide variety of industries and are effective in removal of all types of suspended particles even when numerous types of particles are contained within the same solution.

38 Claims, 1 Drawing Sheet

METHOD FOR REMOVING SUSPENDED PARTICLES USING MANNICH-DERIVED POLYETHERS

FIELD OF THE INVENTION

The present invention relates to methods for treatment of solutions and process streams, generally referred to herein as liquid medium, to remove suspended particles from this medium. More particularly, the present invention relates to methods for removal of suspended particles from liquid medium comprising adding to those solutions a composition comprising one or more Mannich-derivatized polyethers.

BACKGROUND OF THE INVENTION

The present invention is directed to methods which are generally useful in the art of water treatment, particularly the treatment of solutions and process streams and waters generated in a variety of industries. These solutions comprise any number of solids and/or liquids. Treatment of these solutions to remove solids, liquids and other contaminants is often required prior to discharge of the solutions, and is otherwise desirable for environmental, economic and commercial reasons. For example, removal is necessary for compliance with State and Federal discharge regulations, and recovered solids or liquids could be recycled.

Various industrial and other process waters and solutions can contain numerous compounds including suspended solids, colloidal particles, and/or dissolved substances. "Suspended solids" refers to mineral compounds including but not limited to sand, silt, clays, and the like or organic products such as those resulting from the decomposition of plant or animal matter, various acids, microorganisms, various hydrocarbons, including oils and greases from numerous sources. "Colloidal particles" are similar in composition to suspended solids, but generally refer to particles having a smaller size and a settling rate that is extremely slow. The term "dissolved substances" refers to cations and anions, organic matter, and various gases. The large variety of contaminants found in these industrial waste waters can pose a problem in the treatment and removal of these contaminants, in that each type of substance requires a specific treatment for removal. Quite often, the treatment for effecting removal of one form of contaminant will not be effective in removing others.

Numerous industries generate wastewater and/or process streams having solid or particulate contaminants contained therein, including but not limited to the paper processing industry, industrial laundries, the automotive and aeronautical industries, the textile industry, the steel industry, agri-food industries, petrochemicals processing, industrial finishing operations and municipal waste treatment. Paper processing streams can contain, for example, minerals such as kaolin, clay, $TiO_2$ and $CaCO_3$ as well as paper fines and anionic trash; waste water generated by industrial laundries can contain oils, greases, heavy metals, suspended solids such as dirt, hydrocarbon solvents, organic materials and the like. The automotive industry generates large amounts of process stream water containing, among other things, paints and solvents and more recently biomass. The solids and particulate matter can be very fine and therefore difficult to remove by conventional means.

Still other industrial activities requiring the use of process oils and water create waste streams that include mixtures of oil and water. These industries include, for example, the automotive industry, metal parts manufacturing and machining industries, steel mills, petroleum refining operations, adhesive industries, paint industries, textile manufacturing, paper industries, sewage treatment operations, and meat and food processing plants. The mixture of the oil phase and the water phase in which either phase may be dispersed in the other is known as an emulsion. The type of oil found in the emulsion and the concentration of the oil will vary depending on the industry. For example, the oils may include animal, vegetable, mineral or synthetic oil, hydrocarbons, such as tannins or greases, light hydrocarbons such as gasoline, lubricating oil, hydraulic pressure fluids, cutting oils, grinding fluids or animal processing oils. The concentration of the oil in the waste system may range, for example, from about 0.0001 to greater than 10 percent by volume. The aqueous cutting fluids or oils found in much of this waste can be problematic to treat because they are neither biodegradable nor can they be flocculated by conventional means.

The oil and water waste systems generated by industrial activity may include a wide range of various other contaminants in addition to oil. Treatment of the waste system, therefore, may include not only separation of the oil and water phases, but also removal of other contaminants. These contaminants can include various other chemicals, dirts, minerals and the like.

"Removal" as used herein refers to all manners in which one would remove suspended particles, solids, other substances and/or immiscible liquids from a liquid medium, usually water. Encompassed within the term removal, therefore, are the terms coagulation, flocculation, and separation. Although the terms coagulation and flocculation are often used interchangeably, in the present invention coagulation will be used to refer to the destabilization of colloidal particles brought about by the addition of a chemical reagent. In the same context, flocculation is then defined as the agglomeration of destabilized particles into stable aggregates called flocs, such as through use of a high molecular weight (HMW) flocculant or flocculant aid which promotes the formation of the floc. The degree of flocculation can be defined mathematically as the number of particles in a system before flocculation divided by the number of particles (flocs) after flocculation. Flocculation makes the suspension non-homogenous on a macroscopic scale. This allows the subsequent complete or partial separation of the solid or immiscible liquid phase from the bulk liquid medium using one of a number of mechanical devices. Turbidity is defined as the cloudiness or haziness of a liquid caused by finely suspended particles. Turbidity is measured using NTUs (nephelometric turbidity units). Low turbidity systems are generally systems having low solids concentrations (on a weight basis) of 0.1 or less. As a general rule, this corresponds to an approximate turbidity of 50 NTUs or less, but may vary due to the nature of the solids or dissolved colored matter. High solid suspensions include those systems containing in excess of 0.1 weight percent suspended solids, which generally corresponds to a turbidity of greater than 50 NTUs.

U.S. Pat. No. 4,001,155 discloses a paint binder for the cathodic electrocoating of electrically conductive metal surfaces comprising the reaction product of a Mannich base and an epoxide resin containing 1,2 epoxide groups. U.S. Pat. No. 4,396,732 discloses the Mannich base of an amine resin prepared by reacting a dihydric phenolic compound with a diepoxide. Neither of these reference, however, disclose the use of such resins in the treatment of solutions containing suspended particles or other contaminants.

Other Mannich-derivatized compounds are also known. For example, U.S. Pat. No. 4,952,732 relates to Mannich condensates of a substituted phenol and alkylamine containing internal alkoxy groups. The invention is reported as relating to Mannich condensates prepared by reacting formaldehyde with phenol or a phenol substituted in the ortho or para position with a hydrocarbon group and also with an alkylamine, where the alkyl group is separated from the amine group by one or more propoxy groups or by a mixture of ethoxy groups and propoxy groups. WO95/28449 discloses a polymer that is a Mannich derivative of a novolac resin. U.S. Pat. No. 4,883,826 discloses a compound prepared by alkoxylating a Mannich condensate of a phenolic compound, formaldehyde, and a mixture of diethanolamine and at least one other alkanolamine. U.S. Pat. No. 4,917,729 discloses metal chelating compounds that are Mannich derivatized bisphenol compounds, having two Mannich groups, one attached to each ring of the bisphenol. U.S. Pat. Nos. 4,795,505 and 4,792,355 relate to a similar compound having only a single phenol ring and a single Mannich substituent. None of these references disclose or suggest the use of Mannich derivatized compounds in the treatment of solutions for the removal of suspended particles or other contaminants.

Japanese Abstract 58153506 discloses a compound comprising a water soluble cationic condensation polymer of the Mannich reaction product of bisphenol, formaldehyde and dialkylamine polymerized with epihalohydrin. The compound is reported as having use as a flocculant in suspensions in rivers, for accelerating sedimentation of mud in sewage treatment plants, and for disposing oil-bearing effluent in petroleum oil refineries. The compounds disclosed in this abstract differ from those of the present invention in that a highly stable water soluble cationic flocculant is reported in the Japanese abstract, whereas the compound utilized in the present invention has both hydrophobic and hydrophilic portions in the same compound. The joint hydrophobic/hydrophilic portions of the present compounds, which can be adjusted by increasing the percent of one or the other portion as desired by the user, give the present compounds unique surface properties; the charged polyelectrolyte reported in the abstract would not have these properties.

Chem. Abstract 100:158581 discloses the Mannich derivatized phenolic byproducts obtained in the processing of wood tar; the products are taught as being useful as cationic surfactants for coagulation of rubber latexes. German Abstract No. 2333927 reports a polyacrylamide Mannich base useful as a flocculating, sedimentation, dewatering and waste water retention agent. German Abstract No. 2163246 reports the use of aminomethylated polyacrylamides as flocculating agents; the acrylamide polymer is subjected to the Mannich reaction.

There remains a very real and substantial need for methods for treating various solutions and process water and streams that contain one or more contaminants. The present invention addresses this need by providing methods for removing a variety of contaminants contained in the same or different solutions.

SUMMARY OF THE INVENTION

The present invention is directed to methods for removing suspended particles from various solutions comprising adding to said solutions an effective amount of a composition comprising one or more Mannich-derived polyethers. These methods are particularly applicable to the treatment of waste water and process streams generated in the paper processing and automotive industries, although the methods find application in any industry in which contaminated solutions are generated. These methods utilize compositions comprising the products of the condensation polymerization of a Mannich-derivatized bisphenol resin and a difunctional monomer.

It is therefore an object of the invention to provide a method for removing suspended particles from solutions.

It is a further object of the invention to provide such a method using the product of the condensation polymerization of a bisphenol and a difunctional monomer.

Yet another object of the invention is to provide such a method that allows for the removal of numerous types of contaminants, including but not limited to minerals, hydrocarbons, other organic contaminants, inorganic contaminants and the like, from the same or different waste streams or solutions.

These and other objects of the invention will be apparent to those skilled in the art based upon the following description.

DETAILED DESCRIPTION OF THE INVENTION

Figure 1:
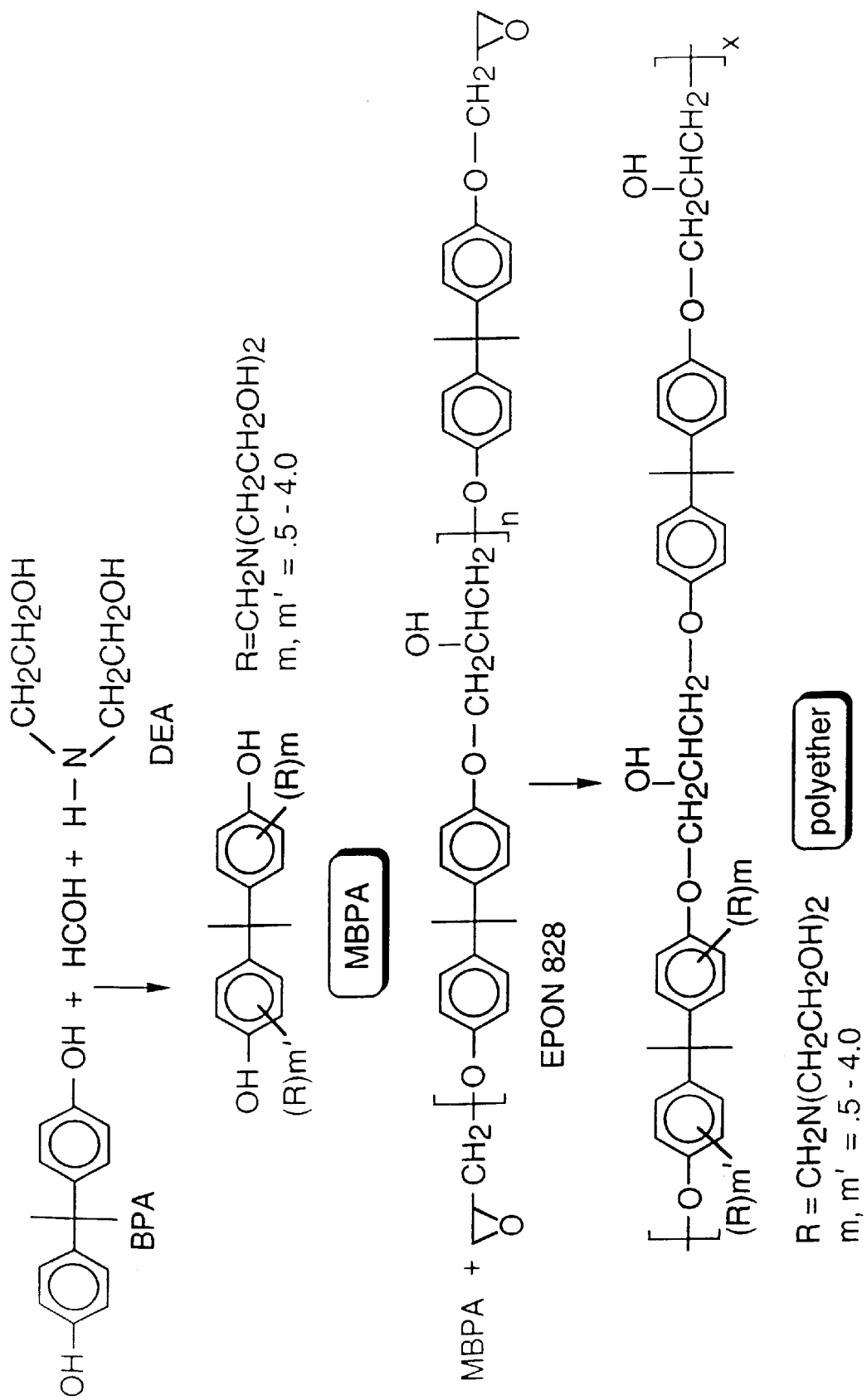
FIG. 1 shows a schematic diagram of the method for preparing a preferred compound used in the methods of the present invention.

The present invention is directed to a method for removing suspended particles from a solution comprising adding to the solution an effective amount of a composition comprising a polymer having at least one repeat unit, or an acid salt thereof, having the formula (1):

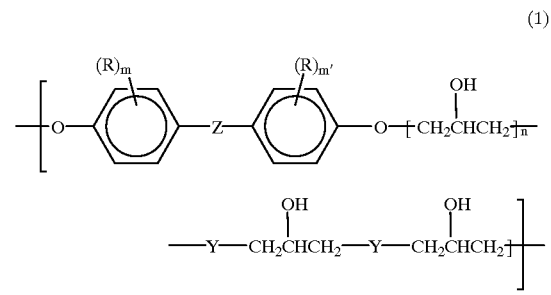

(1)

wherein R is selected from the group consisting of

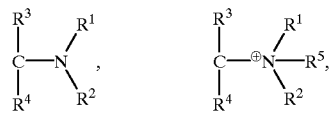

and mixtures thereof; wherein $R^1$ through $R^4$ are independently selected from the group consisting of H, $C_qH_{2q+1}$ and $C_qH_{2q}$—OH; $R^5$ is selected from the group consisting of H, $C_qH_{2q+1}$, —$C_qH_{2q}$—OH, and $C_qH_{2q}$—COOH; q is between about 1 and 18; m and m' each represent the number of "R" substituents and the sum of m and m' for the repeat unit is between about 1 and 4; n is between about 0 and 3; Y is

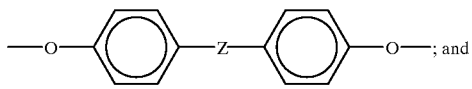

Z is selected from a straight chain or branched chain aliphatic having between about 1 and 3 carbon atoms.

One skilled in the art will appreciate that the polyether of formula (1) is the product of the condensation polymerization of a Mannich-derivatized bisphenol resin and a difunctional epoxy. The polyether is comprised of alternating hydrophilic and hydrophobic resin components. The water solubility of the compound can therefore be altered by increasing or decreasing the amount of each component. Water solubility levels will vary depending on such things as the needs of the user, the type of suspended particles being removed and the solution being treated. The composition is preferably a highly dispersible, water soluble polymer for use in the present methods. This allows the composition to act most effectively in the removal of solids from solution.

The hydrophilic portion of the polyether, referred to herein as "Portion A", is generally represented by formula (2):

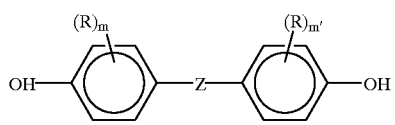

where "R", "m", "m'" and "Z" are as described above.

The hydrophobic portion, referred to herein as "Portion B", is generally represented by formula (3):

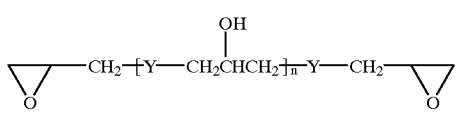

where "Y" and "n" are as described above.

Portion A is the Mannich-derivative of a known class of compounds broadly referred to as bisphenols. The bisphenols which can be used in accordance with this invention are generally represented by formula (4):

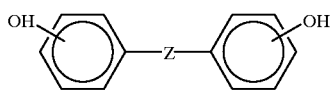

wherein Z is selected from a straight chain or branched chain aliphatic of from 1 to 3 carbon atoms. The preferred bisphenol is bisphenol A (BPA) in which Z is 2,2-propylidene and the two OH groups are in the para position relative to the attachment point of Z. Other bisphenols which can be used include, but are not limited to, 4,4'-thiodiphenol and 4,4'-sulfonyl diphenol. Bisphenol resins are widely commercially available.

Portion B is a resin having two epoxy groups and is therefore a difunctional epoxy. More specifically, Portion B is a diglycidyl capped prepolymer of bisphenol and epichlorohydrin. As illustrated in formula 3 above, Portion B contains an internal repeating unit that can occur in the resin between about 0 and 3 times. The variable "n", therefore, can be between about 0 and 3, and preferably is between 0 and 1. The most preferred of these resins is the difunctional bisphenol A-based epoxy resin, where Z is 2,2-propylidene and the two OH groups are in the para position relative to the attachment point of Z. A preferred diepoxy resin, therefore, is diglycidyl ether of BPA (DGEBPA), which is commercially available from Shell Chemicals, Houston, Tex. in its EPON® line of liquid epoxy resins and resin blends. Particularly preferred is EPON® 828, having a molecular weight of between about 370 and 384. Other EPON® products having molecular weights ranging between 350 and 1,450 can also be used, as can other commercially available difunctional epoxies.

The composition used in the present invention has at least one repeat unit of formula (1) as described above. Typically, the composition will contain a plurality of these repeat units. Each repeat unit can be generally represented by the formula [A-B], and the composition is a polymer that can be generally represented by the formula $[A-B]_x$, where X refers to the number of repeat units in the polymer; A and B refer to Portion A and Portion B, respectively. X will typically range between about 5 and 100, more preferably between about 10 and 60 and most preferably between about 20 and 40. This generally corresponds with molecular weight ranges of 5,000 to 100,000; 10,000 to 60,000; and 20,000 and 40,000, which are the preferred, more preferred and most preferred molecular weights, respectively, for use in the present invention. The optimum molecular weight of the composition will vary depending on the needs of the user, and can be determined by those skilled in the art. Such molecular weight ranges allow the present compounds to function as very effective coagulants and liquid-liquid surface breakers in the methods of the present invention. Coagulation of even very small, dense particles can be achieved according to these methods. It will be understood that the compositions used in the present invention may contain other polyethers such as those represented by the general formulas [A-B-A] and [B-A-B]. More complex branched structures due to the nature of the condensation reaction and the characteristics of the reactants may also be found in the compositions used in the present invention. "Variations of the repeat unit" therefore refers to structures such as [A-B-A], [B-A-B], branched versions of these units and branched versions of the repeat unit. Any number of different variations of the repeat unit can occur during polymerization of Portion A and Portion B, and can be found in the present compositions.

The preparation of the polyethers used herein is described in the art in, for example, U.S. Pat. No. 4,001,155. Preferably, the first step is to prepare the Mannich derivative of the bisphenol compounds described above as formula 4. The terms "Mannich derivative" and "Mannich-derivatized" refer to the product which results by reacting a phenolic group, such as a bisphenol, with an aldehyde and an amine. Reactions between a resin, an aldehyde and an amine are referred to as Mannich Reactions, and the methods for performing such reactions are well known to those skilled in the art.

Formaldehyde is typically the preferred aldehyde for use in the Mannich reaction, although any suitable aldehyde can be used.

Similarly, any suitable amine known to those skilled in the art for effecting the Mannich derivatization of a resin can be used, including but not limited to primary amines, secondary amines, alkanol amines, dialkanol amines, and mixtures thereof. An example of a suitable primary amine is ethanolamine. Suitable secondary alkyl amines which may be used are those of the general formula (5):

(5)

in which $R^1$ and $R^2$ are the same or different and are selected from the group consisting of H, $C_qH_{2q+1}$, $C_qH_{2q}$—OH, where q is between about 1 and 18. Methylethanolamine (MEA) and diethanol amine (DEA) are preferred, with DEA being most preferred.

As will be appreciated by those skilled in the art, bisphenols and numerous other resins are generally insoluble in water. Mannich derivatization of these resins serves to improve their solubility in aqueous systems.

When performing the Mannich reaction on bisphenol, the percentage of bisphenol units in the resin which will undergo derivatization, expressed as the "degree of derivatization", can vary. That is, with reference to formulas 1 or 2, the number of "R" groups attached to each bisphenol molecule can vary from molecule to molecule. At least one bisphenol molecule or repeat unit will have a value of m and m' between 1 and 4; this molecule would therefore have between 1 and 4 "R" groups. While Formula 1 shows two "R" groups attached to the bisphenol, it will be understood that each ring of the bisphenol can have two "R" groups, one "R" group, or no "R" groups, so long as the value of m and m' together are between 1 and 4. The degree of derivatization, or m plus m' of a composition comprising a plurality of repeat units—that is the average number of substituents on all of the bisphenol molecules in the entire composition—will typically range from about 0.5 to 4.0, with the range of 1.0 to 2.5 being preferred and 1.0 to 1.5 being most preferred. The water dispersibility and or solubility of the Mannich-derivatized resin will generally increase with the degree of derivatization.

As described above, the R groups which attach to the bisphenol resin via the Mannich reaction are generally described by the formula (6):

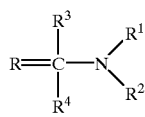
(6)

$R^1$ through $R^4$ can be either the same or different and will vary depending on the amine used in the Mannich reaction. For example, when the amine used in the Mannich reaction is DEA, both $R^1$ and $R^2$ will equal $C_qH_{2q}$—OH, where q equals 2, and $R^3$ and $R^4$ are both hydrogen. Preferably, $R^3$ and $R^4$ are both hydrogen and $R^1$ and $R^2$ are both $C_2H_4OH$. $R^1$ through $R^4$ will be independently selected from the group consisting of hydrogen, $C_qH_{2q+1}$ and $C_qH_{2q}$—OH, wherein q is between about 1 and 18. Preferably, q is between about 1 and 4.

Formula 6 can be further protonized or quaternized to obtain the compound of formula (7):

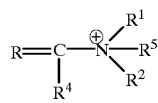
(7)

where $R^5$ is selected from hydrogen, $C_qH_{2q+1}$, $C_qH_{2q}$—OH or $C_qH_{2q}$—COOH, wherein q is between about 1 and 18. Preferably, q is between about 1 and 4. Preferably, $R^5$ is selected from the group consisting of —H, —CH$_3$, —CH$_2$CH$_2$OH and CH$_2$COOH. $R^1$ through $R^4$ are as described above.

It is also possible for a repeat unit to have one or more "R" groups that are represented by Formula 6 and one or more "R" groups that are represented by Formula 7. That is—each R group can be the same or different for each repeat unit, and if different, can represent a mixture of Formulas 6 and 7. Such a mixture is possible, as during quaternization or protonization of the polymer some of the R groups may become quaternized or protonized while others do not. Similarly, all of the R groups can remain uncharged (Formula 6) or can all become charged (Formula 7). In a composition comprising a plurality of repeat units, R will most likely be a mixture of Formulas 6 and 7 when a quaterizing or protonizing agent is also added to the composition. When no such agents are used, R will generally be represented by Formula 6.

The Mannich-derivatized bisphenol (MBP) is then polymerized with the difunctional epoxy "Portion B" to form a polyether. This polymerization is a condensation polymerization, which is described in the Examples and which will be well understood by one skilled in the art. Preparation of a preferred composition for use in the methods of the present invention is presented in FIG. 1. BPA is reacted with formaldehyde and DEA to form MBPA. MBPA is then further reacted with DGEBPA (identified in the figure as EPON 828) to form a polyether represented generally by formula 1.

The polyether is preferably prepared in a suitable solvent. As used herein, the term "suitable solvent" refers to any organic or inorganic solvent, or mixtures thereof, which is capable of dissolving or solubilizing the polyether. Examples would include, but not be limited to, alcohols, ketones, glycol-ether based solvents and mixtures of these solvents. Particularly preferred are ethanol, propylene glycol n-propyl ether, and dipropylene glycol methyl ether.

The Mannich-derivatized resins used in the methods of the present invention will preferably have a molar ratio of BP:aldehyde:amine ranging between about 1:1:1 to 1:4:4. Mannich-derivatives of bisphenol having a ratio of components within the broadest range will typically be soluble in water, either alone or in their protonized or quaternized form, as more fully described below. The molar ratio of MBP to difunctional epoxy will typically range between about 1:2 and 2:1, with a ratio of 1.5–1:1–1.5 preferred.

Although the polyethers used in the methods of this invention are soluble in organic solvents and can be used when dissolved in an organic solvent such as, for example, ethanol, as a practical matter it may be desired to use the treatment compound in a water solution. To provide the desired water solubility or water dispersibility of the polyether, an organic or inorganic acid can be used for protonization or quaternization of the amine moiety thereof. Useful acids for this purpose include but are not limited to acetic, citric, oxalic, ascorbic, phenylphosphonic, chloromethylphosphonic, mono, di and trichloroacetic, trifluoroacetic, nitric, phosphoric, hydrofluoric, sulfuric, boric, hydrochloric, hexafluorosilicic, hexafluorotitanic, hexafluorozirconic or tetrafluoroboric acids, alone or in combination with each other. Phosphoric acid and acetic acid are preferred. Quaternizing agents include, but are not limited to, methyl chloride, dimethyl sulfate, iodomethane and chloroacetic acid. The addition of water to the protonized or quaternized treatment compounds mentioned above results in a water soluble or water dispersible solution of the polyether derivative useful in the removal of suspended particles from solution according to the present invention. Use of one or more of the acids listed above will yield the corresponding acid salt of the starting resin. Use of the quaternizing agents will yield the corresponding quaternized species of the starting resin. Generally, only enough of the protonizing or quaternizing compound is added to solubilize the polyether resin.

The pH of the polyether composition at typical use levels is preferably below about 9, more preferably below about 7. "Use level" refers to the levels at which the present composition is used according to the methods of the present invention and typically reflects the use of the compounds in a solvent diluted with water.

It is contemplated that the treatment compositions of the present invention will be used in a working solution at a dilute concentration. Under some circumstances, however, for example transporting or storing the solution, a concentrate of the solution may be preferred. A solution comprising up to 65 weight % based on active ingredient of the treatment composition may be provided. From a commercial point of view, a suitable concentrate of this invention comprises from about 5 weight % to about 65 weight % of the treatment compound.

The present invention is directed to, but not limited to, methods for removing suspended particles from aqueous systems. As used herein, the terms "suspended particles" or "particulates" refers generally to both suspended solids and liquids, including any number of suspended solids, colloidal particles, dissolved substances, immiscible liquids and particulate matter. Examples include but are not limited to, minerals such as sand, silt, clays, kaolin, titanium dioxide, and calcium carbonate, organic compounds such as oils, greases, hydrocarbon solvents, organic materials, microorganisms, decomposed plant and animal matter and the like, heavy metals such as lead, cadmium and zinc, suspended solids such as paper fibers, dirt and other chemicals. "Suspended particles" as used herein also encompasses immiscible fluids, such as oils, hydrocarbons and other greases.

The terms "solution" and "liquid medium" are used herein in the broadest sense to refer to any sort of aqueous or nonaqueous system or stream, such as process water streams and wastewater. Such liquid media would be generated, for example, by various industries such as those discussed above.

The methods of the present invention comprise the step of adding an effective amount of a composition having at least one repeat unit represented by formula 1 above. As used herein, the term "effective amount" refers to that amount of the composition necessary to bring about the desired level of removal of the suspended particles from the liquid medium, such as the desired level of separation of the oil and water components of the waste system, the removal of suspended solids from a solution, etc. It will be appreciated by those skilled in the art that the amount of composition added will depend on the particular suspended particles being removed and the solution being treated. For example, a heavily contaminated stream will typically require more of the composition than a lightly contaminated stream. In general, at least about 0.1 parts per million of the composition should be added, based on the suspended particle content of the liquid medium being treated.

The composition can be contained in a solvent when added to the liquid medium being treated. Suitable solvents are listed above, and generally include alcohols, ketones, glycols and mixtures thereof. It is also possible to dilute the composition using water prior to addition to the solution being treated.

In one embodiment of the methods of the present invention, a composition having at least one repeat unit represented by formula 1 is added to a liquid medium to effect a destabilization of any suspended particles present in the medium. Depending on the conditions present in the bulk system being treated (pH, temperature, etc.) and the exact composition of the present invention, such a destabilization can be effected via double layer compression of the particles to be removed, adsorption of the present compounds on the individual particulates to cause a reduction in net charge on the particulate, entanglement of the particulates in a complex hydroxide "sweep floc", or a combination of the preceding mechanisms. The destabilization effect of the present invention can be enhanced through any number of conventional means known in the art. For example, depression of the pH in the bulk system could be expected to increase the net cationic charge of the compounds of the invention allowing them to more easily sorb onto the particulates to be treated, thus reducing their net charge and allowing them to come into close enough proximity for intermolecular forces to come into play.

The destabilization effect appears to be especially important in the case of oily waste treatment where the combination of heat and low pH can significantly enhance the performance of one embodiment of the present methods in recovering the oil. Heating the waste increases the motility of the individual oil particulates and thus increases the chances of them coming into intimate contact with the present compounds. The reduced pH initiates a destabilization of the oil particulate by increasing the number of ionic species in solution thus decreasing the radius of the double layer surrounding the oil particulate. The destabilization is further enhanced owing to the additional charge incorporated onto the present compounds allowing them to effectively adsorb onto the individual oil particulate, reducing its net charge and allowing it to come into close enough proximity with other oily particulates to initiate coalescence around the hydrophobic bisphenol portion of the present compounds. Once coalescence of the oil has started the oil droplets rapidly increase in size through impaction with other droplets until a uniform oil layer has formed which can then be removed through conventional means such as skimming or decanting.

Following addition of the compounds according to the present invention, the pH of the solution can be raised into the neutral or slightly alkaline range; this causes the rapid formation of a fluffy, amorphous hydroxide which enmeshes and traps any remaining particulates as it settles, resulting in a clear supernatant which can be separated from the resulting solids via any conventional means such as settling, flotation, filtration or centrifugation. As stated above, there can be numerous mechanisms in operation when effecting the present methods; the "entanglement mechanism," also referred to as a "sweep floc," is believed to be the primary mode of action of most variations of the present invention in destabilizing colloidal particulates. Applicants do not wish to be bound by any particular mechanism, however. An advantage of this type of mechanism is that it is not dependant on the reduction of electrostatic charge and thus is applicable for all types of substrates in the pH range where it occurs, including suspensions that do not normally respond to polymeric flocculants.

It is also within the scope of the present invention to employ one or more additional compositions useful in the destabilization and removal of suspended particles from a liquid to facilitate separation. Depending on the mode of action of these additional compositions as described in the following paragraphs, they may be added prior to, concurrently with, or after addition of the compounds according to the present invention, preferably prior to. In each case additional compounds would be added at an effective dosage required to exhibit their desired effect.

For example, these compositions could be conventional coagulants which, while not able to effect a complete separation of the particulates themselves, would be useful in the formation of nascent agglomerates which would enhance the effect of the subsequent entanglement mechanism. Examples of such coagulants would be cationic polymers containing a quaternary ammonium function including but not limited to pDMDAAC's, polyethyleneimines, or epichlorohydrin based polyamines. Other examples would include di- or tri-valent metal salts of $Al^{+3}$, $Fe^{+3}$, $Fe^{+2}$ or $Ca^{+2}$. Simple adjustments in pH, as discussed above, through the addition of acids or bases, or use of any method of effecting a preliminary destabilization of particulates in the liquid medium readily known to one skilled in the art, can also be employed in conjunction with the present methods.

Also useful in conjunction with the present methods are polymeric flocculants which, while not directly aiding in the destabilization of the particulates, would aid in the formation of larger agglomerates of previously destabilized particulates and hence, facilitate their separation as defined in Stokes Law. Such materials would commonly include polyethylene oxides, polyacrylamides, aminomethylated polyacrylamides or partially hydrolyzed polyacrylamides or copolymers of acrylamides with one or more charged monomers such as acrylic acid, AMPSA (2-acrylamido 2-methylpropane sulfonic acid), DMDAAC (dimethyl diallyl ammonium chloride), AETAC (acryloyloxyethyl trimethyl ammonium chloride), METAC (methacryloyloxyethyl trimethyl ammonium chloride), METAMS (methacryloyloxyethyl trimethyl ammonium methylsulfate) or MAPTAC (methacrylamidopropyl trimethyl ammonium chloride).

The compositions used in the present invention are an extremely flexible and versatile chemistry such that the methods described herein may find application for the treatment of virtually any solution, liquid medium or suspension of particulate matter in which it is desired to separate one or more types of particulate matter from the liquid phase.

As an example of an embodiment representative of the best mode, a Mannich-derivative is prepared via the Mannich Reaction using BPA, formaldehyde and diethanolamine. The MBPA is then polymerized with DGEBPA to form a polyether, which is then treated with phosphoric acid. The composition is then added to a liquid medium containing suspended particles in an amount sufficient to allow removal of suspended particles from the liquid.

EXAMPLES

The following examples are intended to illustrate the invention and should not be construed as limiting the invention in any way.

Example 1—Preparation of Mannich-derivatized Bisphenol A ("MBPA")/EPON Condensate (the "Polyether")

To prepare MBPA, about 312.4 g of Bisphenol A (97%, 1.33 moles) were dissolved in 303.3 g of dipropylene glycol methyl ether, obtained from Arco Chemicals as Arcosolv® DPM, and heated to 55° C. To this solution was added 217.9 g of diethanolamine (99%, 2.05 moles) while the solution was blanketed with a nitrogen stream. While maintaining the nitrogen blanket, 166.6 g of formalin (37% aqueous formaldehyde solution 2.05 moles) was fed into the solution over a 30-minute period. The solution was held at 90° C. with stirring for about 2.5 hours. The BPA: formaldehyde:diethanolamine ratio was 1:1.5:1.5. To 432 grams of this solution was added 150.0 g of EPON® 828 (0.40 mole). The reaction mixture was stirred at about 80° C. for about 5 hours. The resultant product was diluted into an aqueous solution by adding 121.6 g of 80% phosphoric acid and 1193 g of deionized water and stirring until uniform. The product was an aqueous solution having 20% weight active ingredient and a pH of about 2.3. The polyether had a weight average molecular weight of about 9,000 and a ratio of EPON:MBPA of 1:1.4. The polyether is referred to as "Sample 1".

Example 2

The above procedures were repeated to make polymers of different compositions by varying the phenol:formaldehyde:amine, and EPON®:MBPA ratios. In addition, different EPON® resins were employed, as were different neutralizing acids, quaternizing agents and amines. The variations for each of Samples 2–25 are shown in Table 1, below.

TABLE 1

| Sample # | Ratio phenol/ formal- dehyde/ amine | Epon Mole- cular Weight | Epon: MBPA | Molecular Weight* | pH @ 20 wt.% active ingredient | Comm- ents |
|---|---|---|---|---|---|---|
| 2 | 1/1.5/1.5 | 377 | 1/1.1 | | 2.3 | |
| 3 | 1/2.0/2.0 | 377 | 1/1.2 | | 4.0 | |
| 4 | 1/2.0/2.0 | 377 | 1/1.0 | | 5.6 | |
| 5 | 1/2.0/2.0 | 377 | 1/1.0 | 13,000 | 5.5 | |
| 6 | 1/2.0/2.0 | 377 | 1/1.0 | 5,000 | 5.3 | |
| 7 | 1/2.5/2.5 | 348 | 1/1.4 | | 5.2 | |
| 8 | 1/2.5/2.5 | 348 | 1/1.7 | | 5.0 | |
| 9 | 1/2.5/2.5 | 374 | 1/1.0 | 9,000 | 4.3 | |
| 10 | 1/2.6/3.0 | 377 | 1/1.7 | | 6.3 | |
| 11 | 1/2.8/3.0 | 377 | 1/1.7 | | 6.7 | |
| 12 | 1/3.0/3.0 | 348 | 1/1.5 | | 6.0 | |
| 13 | 1/3/3.0 | 377 | 1/1.7 | 4,000 | 5.2 | |
| 14 | 1/3/3.0 | 377 | 1/1.0 | 20,000 | 4.5 | |
| 15 | 1/3/3.0 | 374 | 1/1.0 | 10,000 | 4.5 | |
| 16 | 1/3/3.0 | 374 | 1/1.7 | 7,000 | 5.0 | |
| 17 | 1/3.2/3.0 | 377 | 1/1.0 | | 5.6 | |
| 18 | 1/3.2/3.0 | 377 | 1/1.7 | | 6.6 | |
| 19 | 1/3.4/3.6 | 377 | 1/2.0 | 2,000 | 5.7 @ 30% | |
| 20 | 1/3.4/3.6 | 377 | 1/2.0 | 1,700 | 5.7 @ 30% | |
| 21 | 1/3/3.0 | 377 | 1/2.0 | | 6.5 | acetic acid |
| 22 | 1/2.0/2.0 | 377 | 1/1.0 | | | acetic acid |
| 23 | 1.0/3.0/3.0 | 377 | 1/1.7 | | 6.2 | MAE instead of DEA |
| 24 | 1/2.8/3.0 | 377 | 1/1.7 | | 2.2 | iodo- methane |

TABLE 1-continued

| Sample # | Ratio phenol/ formaldehyde/ amine | Epon Molecular Weight | Epon: MBPA | Molecular Weight* | pH @ 20 wt.% active ingredient | Comments |
|---|---|---|---|---|---|---|
| 25 | 1/3.0/3.0 | 377 | 1/1.7 | | 4.0 | APL instead of DEA |

*Molecular weight was not determined for every sample.
MAE = 2-(methylamino)ethanol
APL = 3-amino-1-propanol

Example 3

Titanium Dioxide Recovery

The efficacy of the present methods to remove and recover titanium dioxide from the cooling water system of a titanium dioxide manufacturing plant was tested.

Hot water was sampled and tested from the cooling system. The water contained approximately 5,000 milligrams per liter of titanium dioxide. To 500 ml of this material was added 200 mg/l of the compound prepared as described above and identified as Sample 2; this product contained 20 percent solids. On mixing, Sample 2 rapidly destabilized the $TiO_2$ colloid into a fine floc which settled to leave a clear supernatant. Subsequent addition of 0.25 milligrams per liter of Pol-E-Z 8736, which is a high molecular weight copolymer of acrylamide/acrylic acid (AM/AA) produced a much larger floc which settled much faster. The results of the testing showed that the colloidal $TiO_2$ could be easily separated from the water sample upon addition of Sample 2 and Pol-E-Z 8736 compounds. Thus, approximately 0.04 grams of the compound of the present invention were used to recover approximately 5 grams of titanium dioxide without effecting its brightness or opacity. The tests were run with a variety of other coagulants both alone and in combination with polymeric flocculants. No other products were found to give acceptable results. Several metal salts were able to effect a similar separation but generally produced higher sludge volumes and had a deleterious effect on brightness of the $TiO_2$.

Example 4

To illustrate the efficacy of the present methods to effect an oil/water separation, 7% mixtures of the following soluble or semi-synthetic oils with water were evaluated: Soluble Oil #6, Rex Roth, CAL LUBE 1705, CAL LUBE 1705, CAL LUBE 1769 and CAL LUBE 1861. The CAL LUBE products are commercially available from Calgon Corporation, Pittsburgh, Pa. The pH of all of these dispersions was initially between 8 and 8.5. All of these formed a cloudy dispersion on mixing and showed no tendency to separate on standing for several days at ambient temperatures.

Each of these samples was separated into four, 400 milligram aliquots for testing. The pH of each of these was adjusted to a pH 2.0 using 10% $H_2SO_4$. This produced no evidence of separation. To one aliquot of each of these oils was added 8000 ppm of the compound prepared as described previously and identified as Sample 2. Similarly, other aliquots were treated with 8000 ppm Arbreak 307 or Arbreak 2190, both commercially available phenolic based emulsion breakers from Magna Chemical. The last set of samples was not treated except for the pH adjustment, and used as a control.

All of the aliquots were shaken to mix them thoroughly and placed in a water bath at about 70° C. Almost immediately, clear oil started to coalesce at the surface of the samples treated with Sample 2. After 24 hours the samples treated with Sample 2 had a clear, well defined oil layer and a slight haze. The remaining samples showed little or no separation. The samples were removed from the bath. After 36 hours, the samples treated with Sample 2 showed one or more clear layers on the surface with a clear subnatant. The remaining samples showed no change.

Thus, the methods of the present invention achieve liquid-liquid separation that is not achieved using other commercially available products. Both liquid-liquid and solid-liquid separations can therefore be effected by the present methods.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for removing suspended particles from a solution comprising adding to said solution an effective amount of a composition having at least one repeat unit, or an acid salt thereof, of the formula (1):

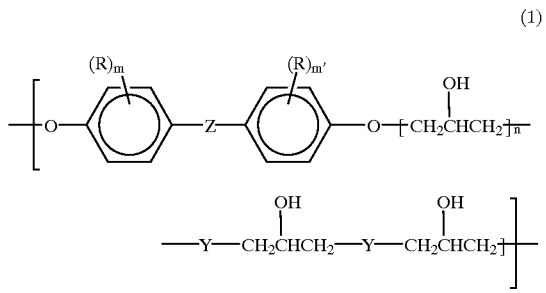

wherein R is selected from the group

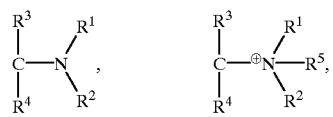

and mixtures thereof; wherein $R^1$ through $R^4$ are independently selected from the group H, $C_qH_{2q+1}$ and $C_qH_{2q}$—OH; $R^5$ is selected from the group H, $C_qH_{2q+1}$, $C_qH_{2q}$—OH and $C_qH_{2q}$—COOH; q is between about 1 and 18; the sum of m and m' is between about 1 and 4; n is between about 0 and 3; Y is

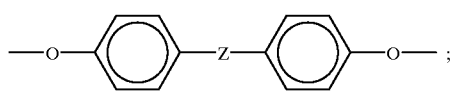

and Z is a straight chain or branched chain aliphatic having between about 1 and 3 carbon atoms.

2. The method of claim 1, wherein said composition has a plurality of repeat units and the average value of m and m' together equals between about 0.5 and 4.0.

3. The method of claim 2, wherein the average value of m and m' together equals between about 1.0 and 1.5.

4. The method of claim 2, wherein R is

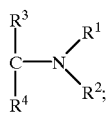

$R^3$ and $R^4$ are both hydrogen; and $R^1$ and $R^2$ are both $C_2H_4OH$.

5. The method of claim 2, wherein m and m' together equal between about 1.0 and 1.5; R equals

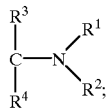

$R_3$ and $R_4$ are both hydrogen; $R_1$ and $R_2$ are both $C_2H_4OH$; n is between 0 and 1; Z is 2,2-propylidene; and the molecular weight of the composition is between about 20,000 and 40,000.

6. The method of claim 2, wherein said composition further comprises variations of the repeat unit.

7. The method of claim 1, wherein n is between 0 and 1.

8. The method of claim 1, wherein Z is 2,2-propylidene.

9. The method of claim 1, wherein the molecular weight of said composition is between about 5,000 and 100,000.

10. The method of claim 1, wherein $R^5$ is selected from the group consisting of —H, —$CH_3$, —$CH_2CH_2OH$, and $CH_2COOH$.

11. The method of claim 1, wherein said suspended particles are minerals selected from the group titanium dioxide, kaolin, clay and calcium carbonate.

12. The method of claim 1, wherein said suspended particles are hydrocarbons.

13. The method of claim 1, wherein said solution is a process water stream.

14. The method of claim 13, wherein said process water stream is a paper process stream.

15. The method of claim 13, wherein said process water stream is a process stream generated by the automotive industry.

16. The method of claim 1, wherein said composition is contained in a solvent.

17. The method of claim 16, wherein the solvent is selected from the group alcohols, ketones, glycol-ether based solvents and mixtures thereof.

18. The method of claim 1, wherein the suspended particles removed from the solution are further extracted from the solution.

19. The method of claim 18, wherein said suspended particles are extracted by means selected from the group decanting, skimming, flotation, centrifugation, settling and filtration.

20. The method of claim 1 further comprising the step of adding an effective amount of a second composition.

21. The method of claim 20, wherein the second composition is selected from the group comprising anionic polymers, cationic polymers containing a quaternary ammonium function, and polysalts.

22. The method of claim 20, wherein the second composition is a polymer containing acrylamide.

23. A method for removing suspended particles from a solution comprising:

a) destabilizing the suspended particles in the solution;

b) adding to the solution an effective amount of a composition having at least one repeat unit, or an acid salt thereof, of the formula (1):

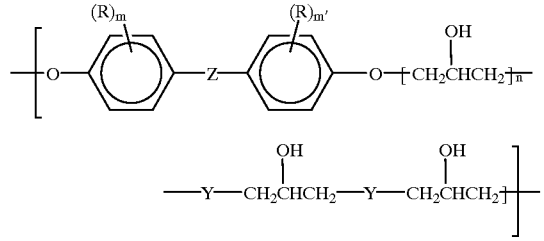

wherein R is selected from the group consisting of

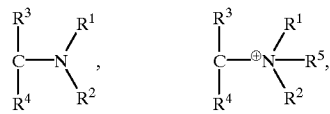

and mixtures thereof; wherein $R^1$ through $R^4$ are independently selected from the group consisting of H, $C_qH_{2q+1}$ and $C_qH_{2q}$—OH; $R^5$ is selected from the group consisting of H, $C_qH_{2q+1}$, $C_qH_{2q}$—OH and $C_qH_{2q}$—COOH; q is between about 1 and 18; the sum of m and m' is between about 1 and 4; n is between about 0 and 3; Y is

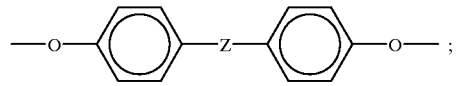

and Z is selected from the group consisting of a straight chain or branched chain aliphatic having between about 1 and 3 carbon atoms.

24. The method of claim 23, wherein destabilization of the solids is effected by changing the pH of said solution.

25. The method of claim 23, wherein destabilization of the solids is effected by charge neutralization.

26. The method of claim 25, wherein charge neutralization is effected by use of an opposite charge destabilizer.

27. The method of claim 26, wherein R is

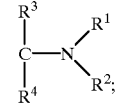

$R^3$ and $R^4$ are both hydrogen; and $R^1$ and $R^2$ are both $C_2H_4OH$.

28. The method of claim 26, wherein said charge destabilizer is selected from the group comprising anionic polymers, cationic polymers and polysalts.

29. The method of claim 28, wherein said charge destabilizer is a polymer containing acrylamide.

30. The method of claim 23, wherein said composition has a plurality of repeat units and the average value of m and m' together equals between about 0.5 and 4.0.

31. The method of claim 30, wherein the average value of m and m' together equals between about 1.0 and 1.5.

32. The method of claim 30, wherein said composition further comprises variations of the repeat unit.

33. The method of claim 23, wherein n is between 0 and 1.

34. The method of claim 23, wherein Z is 2,2-propylidene.

35. The method of claim 23, wherein the molecular weight of said composition is between about 5,000 and 100,000.

36. The method of claim 23, wherein $R^5$ is selected from the group consisting of —H, —$CH_3$, —$CH_2CH_2OH$, and $CH_2COOH$.

37. The method of claim 23, wherein the suspended particles removed from the solution are further extracted from the solution.

38. The method of claim 37, wherein said suspended particles are extracted by means selected from the group decanting, skimming, flotation, centrifugation, settling and filtration.

* * * * *

UNITED STATES PATENT AND TRADEMARK OFFICE
CERTIFICATE OF CORRECTION

PATENT NO. : 6,126,837
DATED : October 3, 2000
INVENTOR(S) : Joseph Miknevich et al.

It is certified that error appears in the above-identified patent and that said Letters Patent is hereby corrected as shown below:

Column 4,
Line 40, formula 1 should read --

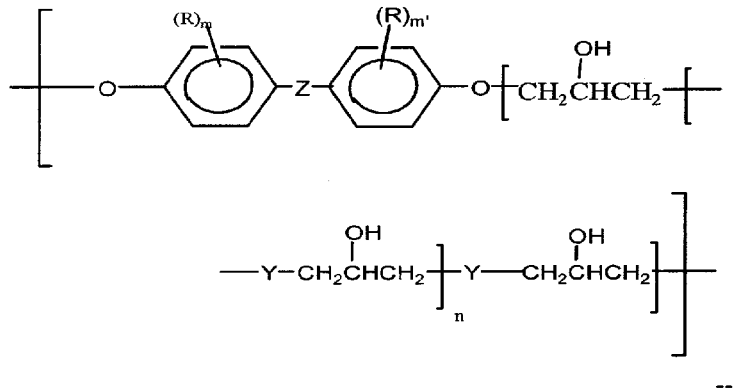

--

Column 8,
Line 5, formula 7, should read --

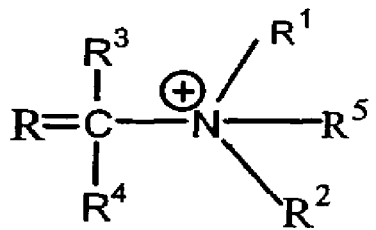

--

Column 14,
Formula 1 should read --

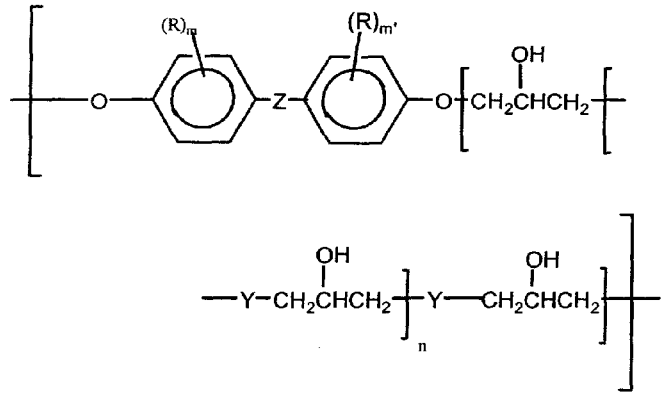

--

UNITED STATES PATENT AND TRADEMARK OFFICE
CERTIFICATE OF CORRECTION

PATENT NO. : 6,126,837
DATED : October 3, 2000
INVENTOR(S) : Joseph Miknevich et al.

It is certified that error appears in the above-identified patent and that said Letters Patent is hereby corrected as shown below:

Column 16,
Formula 1, should read --

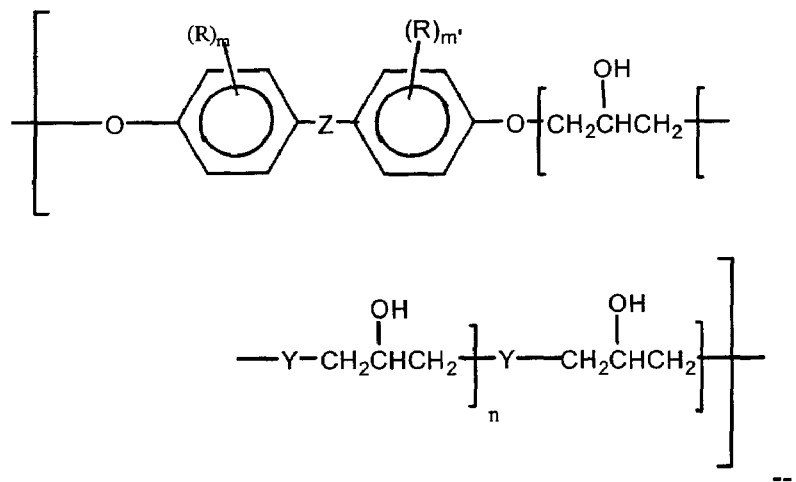

--

Signed and Sealed this

Sixth Day of August, 2002

Attest:

JAMES E. ROGAN
Attesting Officer     Director of the United States Patent and Trademark Office